United States Patent

Yamaguchi et al.

(10) Patent No.: US 8,242,202 B2
(45) Date of Patent: Aug. 14, 2012

(54) CURABLE LIQUID RESIN COMPOSITION

(75) Inventors: Hiroshi Yamaguchi, Tokyo (JP); Satoshi Kamo, Tokyo (JP); Takeo Shigemoto, Tokyo (JP); Zen Komiya, Tokyo (JP)

(73) Assignees: DSM IP Assets B.V., Heerlen (NL); JSR Corporation, Tokyo (JP)

( * ) Notice: Subject to any disclaimer, the term of this patent is extended or adjusted under 35 U.S.C. 154(b) by 982 days.

(21) Appl. No.: 10/592,490

(22) PCT Filed: Mar. 15, 2005

(86) PCT No.: PCT/NL2005/000194
§ 371 (c)(1),
(2), (4) Date: Nov. 20, 2007

(87) PCT Pub. No.: WO2005/087874
PCT Pub. Date: Sep. 22, 2005

(65) Prior Publication Data
US 2008/0254288 A1    Oct. 16, 2008

(30) Foreign Application Priority Data

Mar. 15, 2004   (JP) ................ 2004-073038
Mar. 18, 2004   (JP) ................ 2004-077540

(51) Int. Cl.
*C09D 11/00* (2006.01)
*C08G 18/00* (2006.01)
*B32B 15/00* (2006.01)
*C08L 75/00* (2006.01)
*C08F 283/04* (2006.01)

(52) U.S. Cl. ........ 524/556; 428/375; 525/123; 525/452; 525/454

(58) Field of Classification Search ............ 524/556; 428/375; 525/123, 452, 454
See application file for complete search history.

(56) References Cited

U.S. PATENT DOCUMENTS 5,146,531 A   9/1992   Shustack

FOREIGN PATENT DOCUMENTS

| EP | 0 441 383 | 8/1991 |
|---|---|---|
| EP | 0 441 383 A | 8/1991 |
| JP | 2000-273127 | 3/2000 |
| JP | 2000273127 A | * 10/2000 |

OTHER PUBLICATIONS

European Search Report.

* cited by examiner

*Primary Examiner* — Michael M Bernshteyn
(74) *Attorney, Agent, or Firm* — Nixon & Vanderhye, P.C.

(57) ABSTRACT

The invention relates to a curable liquid resin composition comprising the following components (A), (B), and (C): (A) a urethane (meth)acrylate oligomer, (B) a monomer shown by the following formula (1), $CH_2=CR^1COOR^2$ (1) wherein $R^1$ represents a hydrogen atom or a methyl group and $R^2$ represents a monovalent organic group, 40 wt % or more of the total amount of the component (B) being a monomer in which the $R^2$ group in the formula (1) is a nonpolar organic group, and the monomer in the component (B) in which the $R^2$ group in the formula (1) is a nonpolar organic group being hereinafter referred to as "nonpolar (meth)acrylate-containing monomer", and (C) a polymerization initiator.

9 Claims, No Drawings

CURABLE LIQUID RESIN COMPOSITION

The present invention relates to a curable liquid resin composition having characteristics suitable as an optical fiber coating material, in particular, a primary or a secondary coating material for optical fibers.

In the manufacture of optical fibers, a resin coating is applied to glass fiber produced by spinning molten glass for protection and reinforcement. As such a resin coating, a structure consisting of a primary flexible coating layer formed on the surface of the optical fiber and a secondary rigid coating layer applied thereon is known. Optical fiber ribbons and optical fiber cables comprising a number of optical fibers provided with such a resin coating which are secured using a bundling material are also well known. A resin composition for forming the primary coating layer is called a primary material, a resin composition for forming the secondary coating layer is called a secondary material, and a resin composition for bundling a number of optical fibers is called a bundling material. In addition, a material for further binding several optical fiber ribbons or optical fiber cables is also called a bundling material. The resin coating is usually provided by curing a curable liquid resin composition applied to the surface of the optical fiber by using heat or light, in particular, ultraviolet rays.

A reduction in the diameter or coating thickness of such optical fibers is required to realize multicore optical fiber cables or the like. However, it has been difficult to reduce the diameter or coating thickness without reducing the strength of optical fibers. A coated optical fiber with a thin coating having a specific stress-relaxation time with optical transmission characteristics and mechanical characteristics maintained (Japanese Patent Application Laid-open No. 8-5877), an optical fiber coated with a radiation-curable composition containing a radically curable compound which is capable of producing a cured product having excellent stress-relaxation characteristics (Japanese Patent Application Laid-open No. 2001-31731), and the like have been proposed. However, these cured products cannot sufficiently shorten the stress-relaxation time and cannot solve the problems of the coating thickness reduction and the like.

An object of the present invention is to provide a curable liquid resin composition capable of producing a cured product having a high stress-relaxation rate.

The inventors of the present invention have found that the above object can be achieved by combining a urethane (meth)acrylate oligomer with a specific (meth)acrylate monomer. This finding has led to the completion of the present invention.

Specifically, the present invention provides a curable liquid resin composition comprising the following components (A), (B), and (C):
(A) a urethane (meth)acrylate oligomer,
(B) a monomer shown by the following formula (1),

$$CH_2=CR^1COOR^2 \qquad (1)$$

wherein $R^1$ represents a hydrogen atom or a methyl group and $R^2$ represents a monovalent organic group, 50 wt % or more of the total amount of the component (B) being a monomer in which the $R^2$ group in the formula (1) is a nonpolar organic group, the monomer in the component (B) in which the $R^2$ group in the formula (1) is a nonpolar organic group being hereinafter referred to as "nonpolar (meth)acrylate-containing monomer", and
(C) a polymerization initiator, and
a cured product obtained by curing the composition.

The curable liquid resin composition of the present invention can produce a cured product having a high stress-relaxation rate. In particular, the curable liquid resin composition of the present invention can produce a cured product, suitable as a secondary material, ribbon matrix material, and the like of optical fibers, having a high stress-relaxation rate and a sufficient Young's modulus.

Also the present inventors have found that a curable liquid resin composition having high-speed applicability due to its excellent storage stability and viscosity stability of the liquid resin, capable of producing a cured product having excellent water resistance, and particularly useful as a primary material can be obtained by curing the liquid resin composition according to the invention.

Several curable liquid resin compositions useful as such a primary material are known, for example a composition containing an aliphatic urethane oligomer with low swelling properties in gasoline (Japanese Patent Application Laid-open No. 5-306146), a composition containing an aliphatic urethane oligomer and a hydrocarbon monomer (Japanese Patent Application Laid-open No. 5-306147), and a composition containing a specific silane coupling agent (Japanese Patent Application Laid-open No. 2001-130929).

However, these compositions do not exhibit sufficient stability as a resin composition, do not have viscosity characteristics that can provide high-speed applicability, and are not capable of producing a cured product having sufficient water resistance.

The curable liquid resin composition of the present invention will be described in detail below.

The urethane (meth)acrylate oligomer used as the component (A) in the present invention is synthesized from a polyol compound, a diisocyanate compound, and a hydroxyl group-containing (meth)acrylate, or from a diisocyanate compound and a hydroxyl group-containing (meth)acrylate. Specifically, the component (A) can be obtained by reacting the isocyanate group in the diisocyanate compound with the hydroxyl group in the polyol compound and/or hydroxyl group-containing (meth)acrylate.

In the synthesis of a urethane (meth)acrylate (A1) from the polyol compound, diisocyanate compound, and hydroxyl group-containing (meth)acrylate, these compounds are preferably used in such proportions that the isocyanate group of the diisocyanate compound and the hydroxyl group of the hydroxyl group-containing (meth)acrylate are respectively 1.1-2 equivalents and 0.1-1 equivalent for one equivalent of the hydroxyl group of the polyol compound. In the synthesis of a urethane (meth)acrylate (A2) from the diisocyanate compound and hydroxyl group-containing (meth)acrylate, these compounds are preferably used in such proportions that the isocyanate group of the diisocyanate compound and the hydroxyl group of the hydroxyl group-containing (meth)acrylate are equivalent. In addition, it is possible to synthesize the urethane (meth)acrylate (A1) and the urethane (meth)acrylate (A2) at the same time by adjusting the amount of the polyol compound, diisocyanate compound, and hydroxyl group-containing (meth)acrylate.

As a specific method of carrying out this reaction, for example, a method of reacting the polyol compound, diisocyanate compound, and hydroxyl group-containing (meth)acrylate compound all together; a method of reacting the polyol compound and diisocyanate compound, and reacting the resulting compound with the hydroxyl group-containing (meth)acrylate compound; a method of reacting the diisocyanate compound and hydroxyl group-containing (meth)acrylate compound, and reacting the resulting compound with the polyol compound; and a method of reacting the diisocyanate compound and hydroxyl group-containing (meth)acrylate compound, reacting the resulting compound with the polyol compound, and further reacting the resulting compound with the hydroxyl group-containing (meth)acrylate compound can be given.

In one embodiment of the invention, which is particularly useful as a primary material, the curable liquid resin composition comprising the following components (A), (B), (C), and (D):

(A) a urethane (meth)acrylate obtained from a diol compound, a diisocyanate compound in an amount of 1.1-1.8 molar equivalents for one mol of the diol compound, and a hydroxyl group-containing (meth)acrylate compound,
(B) an alkyl (meth)acrylate shown by the following formula (2),

$$CH_2=C(R^1)COO-C_nH_{2n+1} \qquad (2)$$

wherein $R^1$ represents a hydrogen atom or a methyl group, and n is an integer from 4 to 12, (C) a polymerization initiator, and
(D) a silane coupling agent.

The curable liquid resin composition of said embodiment has high-speed applicability due to its excellent storage stability and viscosity stability. In addition, said composition is capable of producing a cured product having excellent water resistance.

In the above embodiment of the invention the urethane (meth)acrylate of the component (A), which is a polymerizable oligomer, used in the curable liquid resin composition of the present invention can be obtained by reacting a diol compound with a diisocyanate compound at a molar ratio of 1:1.1-1:1.8 to obtain a urethane, compound, and reacting a hydroxyl group-containing (meth)acrylate compound with the isocyanate terminal of the urethane compound. The molar ratio of the diol compound to the diisocyanate compound is more preferably 1:1.1-1:1.7. If the molar ratio is less than 1:1.1, the urethane compound not only has a significantly large molecular weight, but also may not have an isocyanate group at the molecular terminal, resulting in impaired applicability and storage stability of the liquid resin. If the molar ratio is in the range of 1:1.1-1:1.8, the resin composition has superior properties as a primary material due to a relatively low Young's modulus of elasticity of the resulting cured products.

As a specific method of reaction, a method of reacting the diol compound with the diisocyanate compound, and reacting the resulting product with the hydroxyl group-containing (meth)acrylate compound is preferable.

As the diisocyanate compound which is used for synthesis of the urethane (meth)acrylate (A), an aromatic diisocyanate, alicyclic diisocyanate, aliphatic diisocyanate, and the like can be given. As examples of the aromatic diisocyanate, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanateethyl)fumarate, 6-isopropyl-1,3-phenyl diisocyanate, 4-diphenylpropane diisocyanate, tetramethylxylylene diisocyanate, and the like can be given. Examples of the alicyclic diisocyanate include isophorone diisocyanate, methylenebis(4-cyclohexylisocyanate), hydrogenated diphenylmethane diisocyanate, hydrogenated xylylene diisocyanate, 2,5-bis(isocyanatemethyl)-bicyclo[2.2.1]heptane, 2,6-bis(isocyanatemethyl)-bicyclo[2.2.1]heptane, and the like. As examples of the aliphatic diisocyanate, 1,6-hexane diisocyanate, 2,2,4-trimethylhexamethylene diisocyanate, lysine diisocyanate, and the like can be given.

Of these, aromatic diisocyanate compounds, particularly 2,4-tolylene diisocyanate and 2,6-tolylene diisocyanate, and isophorene diisocyanate are preferable to economically obtain a composition with stable quality. The diisocyanate may be used either individually or in combination of two or more.

As examples of the polyol compound used for preparation of the urethane (meth)acrylate (A), polyether diols such as aliphatic polyether diol, alicyclic polyether diol, and aromatic polyether diol, polyester diol, polycarbonate diol, polycaprolactone dial, and the like can be given. These polyols may be used either individually or in combination of two or more. Polyols having two or more hydroxyl, groups which are synthesized by reacting a diol and a polyisocyanate can also be used as the polyol compound. There are no specific limitations to the manner of polymerization of each structural unit of these diols. Any of random polymerization, block polymerization, and graft polymerization may be employed.

As examples of the aliphatic polyether diol, polyethylene glycol, polypropylene glycol, polytetramethylene glycol, polyhexamethylene glycol, polyheptamethylene glycol, polydecamethylene glycol, polyether diols obtained by the ring-opening copolymerization of two or more ion-polymerizable cyclic compounds, and the like can be given.

As examples of the ion-polymerizable cyclic compound, cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinyl cyclohexene oxide, phenyl glycidyl ether, butyl glycidyl ether, and glycidyl benzoate can be given.

As specific examples of the polyether diol obtained by the ring-opening copolymerization of two or more of the ion-polymerizable cyclic compounds, binary copolymers obtained by the ring-opening copolymerization of the combination of monomers such as tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, and butene-1-oxide and ethylene oxide, ternary copolymers obtained by the ring-opening copolymerization of the combination of monomers such as tetrahydrofuran, butene-1-oxide, and ethylene oxide, and the like can be given.

Polyether diols obtained by the ring-opening copolymerization of the ion-polymerizable cyclic compounds and cyclic imines such as ethyleneimine, cyclic lactones such as β-propyolactone and lactide glycolate, or dimethylcyclopolysiloxanes may also be used.

Examples of commercially available products of the aliphatic polyether diol include PTMG650, PTMG1000, PTMG2000 (manufactured by Mitsubishi Chemical Corp.), PPG400, PPG1000, EXCENOL 720, 1020, 2020 (manufactured by Asahi Oline Co., Ltd.), PEG1000, UNISAFE DC1100, DC1800 (manufactured by Nippon Oil and Fats Co., Ltd.), PPTG2000, PPTG1000, PTG400, PTGL2000 (manufactured by Hodogaya Chemical Co., Ltd.), Z-3001-4, Z-3001-5, PBG2000, PBG2000B, EO/BO4000, EO/BO2000 (manufactured by Dai-ichi Kogyo Seiyaku Co., Ltd.), and Acclaim 2200, 2220, 3201, 3205, 4200, 4220, 8200, and 12000 (manufactured by Sumitomo Bayer Urethane Co., Ltd.), and the like.

As examples of the alicyclic polyether diol, alkylene oxide addition diol of hydrogenated bisphenol A, alkylene oxide addition diol of hydrogenated bisphenol F, alkylene oxide addition diol of 1,4-cyclohexane diol, and the like can be given.

As examples of the aromatic polyether diol, alkylene oxide addition diol of bisphenol A, alkylene oxide addition diol of bisphenol F, alkylene oxide addition diol of hydroquinone, alkylene oxide addition diol of naphthohydroquinone, alkylene oxide addition diol of anthrahydroquinone, and the like can be given. Commercially available products such as Uniol DA400, DA700, DA1000, and DA4000 (manufactured by Nippon Oil and Fats Co., Ltd.) can be used as the aromatic polyether diol.

As examples of the polyester diol, polyester diols obtained by reacting a polyhydric alcohol with a polybasic acid, and the like can be given. Examples of the polyhydric alcohol include ethylene glycol, polyethylene glycol, propylene glycol, polypropylene glycol, tetramethylene glycol, polytetramethylene glycol, 1,6-hexanediol, neopentyl glycol, 1,4-cyclohexanedimethanol, 3-methyl-1,5-pentanediol, 1,9-nonanediol, 2-methyl-1,8-octanediol, and the like. As examples of the polybasic acid, phthalic acid, isophthalic acid, terephthalic acid, maleic acid, fumaric acid, adipic acid, and sebacic acid can be given.

As examples of commercially available products of the above polyester diols, Kurapol P-2010, P-1010, L-2010, L-1010, A-2010, A-1010, F-2020, F-1010, PMIPA-2000, PKA-A, PNOA-2010, PNOA-1010 (manufactured by Kuraray Co., Ltd.), and the like can be given.

As examples of the polycarbonate diol, polycarbonate of polytetrahydrofuran, polycarbonate of 1,6-hexanediol, and the like, and commercially available products such as DN-980, 981, 982, 983 (manufactured by Nippon Polyurethane Industry Co., Ltd.), PC-8000 (manufactured by PPG), PC-THF-CD (manufactured by BASF) can be given.

As examples of the polycaprolactone diol, polycaprolactone diols obtained by reacting ε-caprolactone and dials, and the like can be given. Examples of such diols used for the reaction with ε-caprolactone include ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexanedimethanol, 1,4-butanediol, and the like. These polycaprolactone dials are commercially available as PLACCEL 205, 205AL, 212, 212AL, 220, 220AL (manufactured by Daicel Chemical Industries, Ltd.), and the like.

Examples of polyols other than the above-mentioned diols include ethylene glycol, propylene glycol, 1,4-butanediol, 1,5-pentanediol, 1,6-hexanediol, neopentyl glycol, 1,4-cyclohexanedimethanol, hydrogenated bisphenol A, hydrogenated bisphenol F, dimethylol compound of dicyclopentadiene, tricyclodecanedimethanol, pentacyclodecanedimethanol, β-methyl-δ-valerolactone, polybutadiene with a terminal hydroxyl group, hydrogenated polybutadiene with a terminal hydroxyl group, castor oil-modified diol, polydimethylsiloxane compounds with terminal diols, polydimethylsiloxane carbitol modified polyol, and the like.

For some application, of these diol compounds, ring-opening polymers of one or more ion-polymerizable cyclic compounds having 2-4 carbon atoms and having an average molecular weight of 1,000-5,000 are preferable in view of compatibility of high speed applicability of the resin composition and flexibility of the coating material. As such preferable diol compounds, ring-opening polymers of at least one oxide selected from the group consisting of ethylene oxide, propylene oxide, butene-1-oxide, and isobutene oxide, having an average molecular weight of 1,000-5,000 can be given. A particularly preferable polymer is a ring-opening polymer of propylene oxide having an average molecular weight of 1,000-5,000.

As the hydroxyl group-containing (meth)acrylate compounds used for synthesis of the urethane (meth)acrylate (A), a hydroxyl group-containing (meth)acrylate containing a hydroxyl group bonded to a primary carbon atom (hereinafter designated as "(meth)acrylate containing a primary hydroxyl group") and a hydroxyl group-containing (meth)acrylate containing a hydroxyl group bonded to a secondary carbon atom (hereinafter designated as "(meth)acrylate containing a secondary hydroxyl group") are preferable. A hydroxyl group-containing (meth)acrylate containing a hydroxyl group bonded to a tertiary carbon atom (hereinafter designated as "(meth)acrylate containing a tertiary hydroxyl group") is not preferred because of its poor reactivity with an isocyanate group.

As examples of the (meth)acrylate containing a primary hydroxyl group, 2-hydroxyethyl (meth)acrylate, 3-hydroxypropyl (meth)acrylate, 4-hydroxybutyl (meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth)acrylate, (meth)acrylates shown by the following formula (3), and the like can be given.

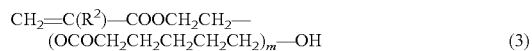

$$CH_2=C(R^2)-COOCH_2CH_2-(OCOCH_2CH_2CH_2CH_2CH_2)_m-OH \qquad (3)$$

wherein $R^2$ represents a hydrogen atom or a methyl group and m is an integer from 1 to 3.

Examples of the (meth)acrylate containing a secondary hydroxyl group include 2-hydroxypropyl (meth)acrylate, 2-hydroxybutyl (meth)acrylate, 2-hydroxy-3-phenyloxypropyl (meth)acrylate, 4-hydroxycyclohexyl (meth)acrylate, compounds obtained by the addition reaction of (meth)acrylic acid and a glycidyl group-containing compound such as alkyl glycidyl ether, allyl glycidyl ether, or glycidyl (meth)acrylate, and the like.

The amount of the hydroxyl group-containing (meth)acrylates is preferably 0.1-0.8 equivalent, particularly 0.1-0.7 equivalent, for one equivalent of the hydroxyl group included in the diol compound.

It is possible to use a diamine together with a diol for synthesis of the urethane (meth)acrylate (A). Examples of such a diamine include ethylenediamine, tetramethylenediamine, hexamethylenediamine, p-phenylenediamine, 4,4'-diaminodiphenylmethane, diamines containing a heteroatom, polyether diamines, and the like.

Part of the hydroxyl group-containing (meth)acrylate may be replaced by compounds having a functional group which can be added to the isocyanate group. For example, γ-aminopropyltriethoxysilane, γ-mercaptopropyltrimethoxysilane, and the like can be given. Use of these compounds improves adhesion to substrates such as glass.

In the synthesis of the urethane (meth)acrylate (A), it is desirable to use a urethanization catalyst, such as copper naphthenate, cobalt naphthenate, zinc naphthenate, dibutyltin dilaurate, dioctyltin dilaurate, triethylamine, 1,4-diazabicyclo[2.2.2]octane, or 2,6,7-trimethyl-1,4-diazabicyclo[2.2.2]octane, in an amount from 0.01 to 1 wt % of the total amount of the reactants. The reaction temperature is usually 5-90° C., and preferably 10-80° C.

In one embodiment of the invention, i.e. for resins particularly suitable for primary coatings, the urethane (meth)acrylate (A) used has a polystyrene-reduced molecular weight measured by gel permeation chromatography in the range of 1,500-20,000, and preferably 2,500-12,000. If the molecular weight is less than 1,500, the resulting cured product may exhibit decreased elongation at break. If more than 20,000, the resin composition may have unduly increased viscosity.

In another embodiment of the invention, i.e. for resins particularly suitable for secondary material, ribbon matrix material, and the like, the urethane (meth)acrylate (A) used in the present invention has a polystyrene-reduced molecular weight measured by the gel permeation chromatography in the range of 500-20,000, and preferably 700-15,000. If the molecular weight is less than 500, the cured products may exhibit decreased elongation at break; if more than 20,000, on the other hand, the resin composition may have unduly high viscosity.

In one embodiment of the invention, i.e. for resins particularly suitable for primary coatings, the amount of the urethane (meth)acrylate (A) in the curable liquid resin composition of the present invention is preferably 30-90 mass %, more preferably 35-85 mass %, and particularly preferably 45-75 mass %. If less than 30 mass %, the modulus of elasticity varies to a large extent depending on the temperature; if more than 90 mass %, the curable liquid resin composition may have unduly high viscosity.

In another embodiment of the invention, i.e. for resins particularly suitable for secondary material, the amount of the urethane (meth)acrylate (A) in the curable liquid resin composition of the present invention is preferably 30-90 wt %, more preferably 55-87 wt %, and particularly preferably 65-85 wt %. If less than 30 wt %, the modulus largely depends upon temperatures; if more than 90 wt %, the curable liquid resin composition may have unduly high viscosity.

The component (B) used in the present invention is a monomer shown by the following formula (1).

$$CH_2=CR^1COOR^2 \qquad (1)$$

wherein $R^1$ represents a hydrogen atom or a methyl group, and $R^2$ represents a monovalent organic group, Specific examples of the component (B) include: (meth)acrylates having an alkyl group such as butyl (meth)acrylate, isobutyl (meth)acrylate, t-butyl (meth)acrylate, pentyl (meth)acrylate, amyl (meth)acrylate, isoamyl (meth)acrylate, hexyl (meth)acrylate, heptyl (meth)acrylate, octyl (meth)acrylate, 2-ethylhexyl (meth)acrylate, iso-octyl (meth)acrylate, nonyl (meth)acrylate, iso-nonyl (meth)acrylate, decyl (meth)acrylate, iso-decyl (meth)acrylate, undecyl (meth)acrylate, dodecyl (meth)acrylate, and lauryl (meth)acrylate; alicyclic structure-containing (meth)acrylates such as isobornyl (meth)acrylate, bornyl (meth)acrylate, tricyclodecanyl (meth)acrylate, dicyclopentanyl (meth)acrylate, dicyclopentenyl (meth)acrylate, 4-butylcyclohexyl (meth)acrylate, and cyclohexyl (meth)acrylate; (meth)acrylate having an aromatic ring such as benzyl (meth)acrylate; other monofunctional (meth)acrylates such as 2-hydroxyethyl (meth)acrylate, 2-hydroxypropyl (meth)acrylate, 4-hydroxybutyl acrylate, stearyl (meth)acrylate, iso-stearyl (meth)acrylate, tetrahydrofurfuryl (meth)acrylate, polyethylene glycol mono(meth)acrylate, polypropylene glycol mono(meth)acrylate, methoxyethylene glycol (meth)acrylate, ethoxyethyl (meth)acrylate, methoxypolyethylene glycol (meth)acrylate, methoxy polypropylene glycol (meth)acrylate, dimethylaminoethyl (meth)acrylate, diethylaminoethyl (meth)acrylate, and 7-amino-3,7-dimethyloctyl (meth)acrylate; polyfunctional (meth)acrylates such as trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl)isocyanurate tri(meth)acrylate, tris(2-hydroxyethyl) isocyanurate di(meth)acrylate, tricyclodecanedimethanol di(meth)acrylate, di(meth)acrylate of ethylene oxide or propylene oxide addition diol of bisphenol A, di(meth)acrylate of ethylene oxide or propylene oxide addition diol of hydrogenated bisphenol A, epoxy (meth)acrylate obtained by the addition of (meth)acrylate to diglycidyl ether of bisphenol A, triethylene glycol divinyl ether, and the like.

As examples of commercially available monofunctional (meth)acrylates, ARONIX M-111, M-113, M-114, M-117 (manufactured by Toagosei Co., Ltd.), KAYARAD TC110S, R629, R644 (manufactured by Nippon Kayaku Co., Ltd.), IBXA, Viscoat 3700 (manufactured by Osaka Organic Chemical Industry, Ltd.), and the like can be given. Examples of commercially available products of the above polyfunctional (meth)acrylates include Yupimer UV SA1002, SA2007 (manufactured by Mitsubishi Chemical Corp.), Viscoat 700 (manufactured by Osaka Organic Chemical Industry, Ltd.), KAYARAD R-604, DPCA-20, DPCA-30, DPCA-60, DPCA-120, HX-620, D-310, D-330 (manufactured by Nippon Kayaku Co., Ltd.), ARONIX M-210, M-215, M-315, M-325 (manufactured by Toagosei Co., Ltd.), and the like.

It is essential for the composition of the present invention to contain non-polar (meth)acrylate monomers in which $R^2$ is an non-polar organic group as the component (B) in the amount of 40 wt % or more, preferably 50 wt % or more, more preferably 80 wt % or more, and particularly preferably 100 wt % of the total component (B). If the amount is less than 40 wt %, a good stress-relaxation rate cannot be obtained.

Although there are no specific limitations to the non-polar (meth)acrylate monomers inasmuch as $R^2$ in the above formula (1) is an organic group that does not have a polar group such as a hydroxyl group, the non-polar (meth)acrylate monomer is preferably a (meth)acrylate in which the group $R^2$ is a linear or branched alkyl group, and particularly a linear or branched alkyl group having 4-12 carbon atoms, with 2-ethylhexyl (meth)acrylate being most preferable.

Given as examples of the component (B) in the curable liquid resin composition of the present invention, which is the (meth)acrylate compound shown by the formula (1), are butyl (meth)acrylate, isobutyl (meth)acrylate, t-butyl (meth)acrylate, amyl (meth)acrylate, isoamyl (meth)acrylate, hexyl (meth)acrylate, heptyl (meth)acrylate, octyl (meth)acrylate, 2-ethylhexyl (meth)acrylate, iso-octyl (meth)acrylate, nonyl (meth)acrylate, iso-nonyl (meth)acrylate, decyl (meth)acrylate, iso-decyl (meth)acrylate, undecyl (meth)acrylate, and lauryl (meth)acrylate.

Of these (meth)acrylate compounds, the compounds having 8 or 9 for n in the formula (2) are preferred in view of processability. A particularly preferred (meth)acrylate compound is 2-ethylhexyl acrylate having 8 for n in the formula (2) in view of low viscosity and excellent stability of the resin composition.

In one embodiment of the invention, i.e. for resins particularly suitable for primary coatings, the (meth)acrylate compound (B) is used in the curable liquid resin composition of the present invention in an amount of preferably 8-60 mass %, and more preferably 10-30 mass %. If less than 8 mass %, the effect of improvement in the mechanical properties of the cured product is insufficient due to increased viscosity; if more than 60 mass %, volatility of the resin composition is unacceptably high.

In another embodiment of the invention, i.e. for resins particularly suitable for secondary coatings, to produce a coating material with moderate viscosity, Young's modulus, and stress-relaxation rate, the component (B) is used in the curable liquid composition of the present invention in an amount of 5-50 wt %, and particularly 10-35 wt %.

As the polymerization initiator (C) used in the curable liquid resin composition of the present invention, a heat polymerization initiator or a photoinitiator can be used.

If the curable liquid resin composition of the present invention is cured using heat, a heat polymerization initiator such as a peroxide or azo compound can usually be used. As specific examples of the heat polymerization initiator, benzoyl peroxide, t-butyloxybenzoate, and azobisisobutyronitrile can be given.

If the curable liquid resin composition of the present invention is cured using light, a photoinitiator is used. Optionally, a photosensitizer may also be added. Given as examples of the photoinitiator are 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide; IRGACURE 184, 369, 651, 500, 907, CGI 1700, CGI 1750, CGI 1850, CG24-61, Darocur 1116, 1173 (manufactured by Ciba Specialty Chemicals Co.); Lucirin TPO (manufactured by BASF); and Ubecryl P36 (manufactured by UCB). As examples of the photosensitizer, triethylamine, diethylamine, N-methyldiethanoleamine, ethanolamine, 4-dimethylaminobenzoic acid, 4-methyl dimethylaminobenzoate, 4-ethyl dimethylaminobenzoate, 4-isoamyl dimethylaminobenzoate; Ubecryl P102, 103, 104, 105 (manufactured by UCB); and the like can be given.

The polymerization initiator (C) is used in the curable liquid composition of the present invention in an amount of preferably 0.1-10 wt %, and particularly preferably 0.3-7 wt %.

In one embodiment of the invention, i.e. for resins particularly suitable for primary coatings, a silane coupling agent (D) is preferably used in the curable liquid resin composition of the present invention. Said silane coupling agent is not particularly limited. Examples include vinyltrichlorosilane, vinyltriethoxysilane, vinyltris(β-methoxyethoxy)silane, γ-(3,4-epoxycyclohexyl)ethyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-β-aminopropyltrimethoxysilane, γ-chloropropyltrimethoxysilane, γ-mercaptopropyltrimethoxysilane, γ-aminopropyltrimethoxysilane, and the like can be given. In addition, bis-[3-(triethoxysilyl)propyl]tetrasulfide, bis-[3-(triethoxysilyl)propyl]disulfide, γ-trimethoxysilylpropyldimethylthiocarbamyltetrasulfide, γ-trimethoxysilylpropylbenzothiazyltetrasulfide, and the like can be given. As commercially available products, SH6062, SH6030 (manufactured by Toray-Dow Corning Silicone Co. Ltd.), KBE 903, 603, 403 (manufactured by Shin-Etsu Chemical Co., Ltd.), and the like can be given. Of these silane coupling agents, γ-glycidoxypropyltrimethoxysilane, γ-methacryloxypropyltrimethoxysilane, γ-mercaptopropyltrimethoxysilane, and γ-aminopropyltrimethoxysilane are preferable in view of excellent covering properties and adhesion to glass. These silane coupling agents may be used individually or in combination of two or more.

To ensure excellent covering properties and adhesion to glass, the silane coupling agent (D) is used in the curable liquid resin composition of the present invention in an amount of preferably 0.01-2 mass %, more preferable 0.1-1.5 mass %, and particularly preferably 0.5-1.5 mass %.

In addition to the above components, a polymerizable unsaturated monomer (E) other than the (meth)acrylate compound (B) shown by the formula (1) may be added to the composition of the present invention in an amount of 0-60 wt %, and preferably 3-40 wt % in order increase curability and adjust the viscosity of the curable liquid resin composition. If the component (E) is added in an amount of more than 60 wt %, temperature dependency of the modulus of elasticity of the cured product may increase.

Monofunctional compounds and/or polyfunctional compounds are given as examples of the polymerizable unsaturated monomer (E). As examples of the monofunctional compound, vinyl group-containing lactams such as N-vinylpyrrolidone and N-vinylcaprolactam, alicyclic structure-containing (meth)acrylates such as isobornyl (meth)acrylate, bornyl (meth)acrylate, tricyclodecanyl (meth)acrylate, dicyclopentanyl (meth)acrylate, dicyclopentenyl (meth)acrylate, and cyclohexyl (meth)acrylate, benzyl (meth)acrylate, 4-butylcyclohexyl (meth)acrylate, acryloylmorpholine, vinylimidazole, vinylpyridine, and the like can be given. In addition to the above compounds, 2-hydroxyethyl (meth)acrylate, 2-hydroxypropyl (meth)acrylate, 4-hydroxybutyl acrylate, stearyl (meth)acrylate, iso-stearyl (meth)acrylate, tetrahydrofurfuryl (meth)acrylate, polyethylene glycol mono(meth)acrylate, polypropylene glycol mono (meth)acrylate, methoxyethylene glycol (meth)acrylate, ethoxyethyl (meth)acrylate, methoxypolyethylene glycol (meth)acrylate, methoxypolypropylene glycol (meth)acrylate, diacetone(meth)acrylamide, isobutoxymethyl(meth)acrylamide, N,N-dimethyl(meth)acrylamide, t-octyl(meth)acrylamide, dimethylaminoethyl (meth)acrylate, diethylaminoethyl (meth)acrylate, 7-amino-3,7-dimethyloctyl (meth)acrylate, N,N-diethyl(meth)acrylamide, N,N-dimethylaminopropyl(meth)acrylamide, hydroxybutyl vinyl ether, lauryl vinyl ether, cetyl vinyl ether, 2-ethylhexyl vinyl ether, vinyloxyethoxyethyl (meth)acrylate, vinyloxyethyl (meth)acrylate, and the like can be given.

As examples of commercially available products of the monofunctional compound used as the polymerizable unsaturated monomer, ARONIX M-111, M-113, M-114, M-117 (manufactured by Toagosei Co., Ltd.), KAYARAD TC110S, R629, R644 (manufactured by Nippon Kayaku Co., Ltd.), IBXA, Viscoat 3700 (manufactured by Osaka Organic Chemical Industry, Ltd.), and the like can be given.

As examples of the polyfunctional compound, trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl (meth)acrylate, tris(2-hydroxyethyl) isocyanurate tri(meth)acrylate, tris(2-hydroxyethyl) isocyanurate di(meth)acrylate, tricyclodecanedimethanol di(meth)acrylate, di(meth)acrylate of ethylene oxide or propylene oxide addition diol of bisphenol A, di(meth)acrylate of ethylene oxide or propylene oxide addition diol of hydrogenated bisphenol A, epoxy(meth)acrylate obtained by the addition of (meth)acrylate to diglycidyl ether of bisphenol A, triethylene glycol divinyl ether, and the like can be given.

Examples of commercially available products of the above polyfunctional compounds include Yupimer UV SA1002, SA2007 (manufactured by Mitsubishi Chemical Corp.), Viscoat 700 (manufactured by Osaka Organic Chemical Industry, Ltd.), KAYARAD R-604, DPCA-20, DPCA-30, DPCA-60, DPCA-120, HX-620, D-310, D-330 (manufactured by Nippon Kayaku Co., Ltd.), ARONIX M-210, M-215, M-315, M-325 (manufactured by Toagosei Co., Ltd.), and the like.

Lactams containing a vinyl group such as N-vinylpyrrolidone and N-vinylcaprolactam are preferable as the components (E) in view of an increase in the cure speed.

Additives such as antioxidants, coloring agents, UV absorbers, light stabilizers, heat polymerization inhibitors, leveling agents, surfactants, preservatives, plasticizers, lubricants, solvents, fillers, aging preventives, wettability improvers, and coating surface improvers may be added to the composition in addition to the above components, as required. As examples of the antioxidant, Irganox 1010, 1035, 1076, 1222 (manufactured by Ciba Specialty Chemicals Co., Ltd.), Antigene P, 3C, Sumilizer GA-80, GP (manufactured by Sumitomo Chemical Industries Co., Ltd.), and the like can be given. As examples of the UV absorber, Tinuvin P, 234, 320, 326, 327, 328, 329, 213 (manufactured by Ciba Specialty Chemicals Co., Ltd.), Seesorb 102, 103, 110, 501, 202, 712, 704 (manufactured by Shipro Kasei K.K.), and the like can be given. As examples of the light stabilizer, Tinuvin 292, 144, 622LD (manufactured by Ciba Specialty Chemicals Co., Ltd.), Sanol LS770 (manufactured by Sankyo Co., Ltd.), TM-061 (manufactured by Sumitomo Chemical Co., Ltd.), and the like can be given.

Furthermore, other oligomers, polymers, or additives can optionally be added to the curable liquid resin composition of the present invention, insofar as the characteristics of the composition of the present invention are not impaired.

As examples of such other oligomers or polymers, polyester (meth)acrylate, epoxy (meth)acrylate, polyamide (meth) acrylate, siloxane polymer having a (meth)acryloyloxy group, glycidyl methacrylate, and the like can be given.

The curable liquid composition of the present invention is cured using heat or radiation. Radiation used herein includes infrared rays, visible rays, ultraviolet rays, X-rays, electron beams, $\alpha$-rays, $\beta$-rays, $\gamma$-rays, and the like. Of these, ultraviolet rays are particularly preferable.

In view of ensuring excellent handling properties and applicability, the viscosity of the curable liquid resin composition of the present invention is preferably in the range of 0.1-10 Pa·s, preferably 1-8 Pa·s, and particular preferably 2-6 Pa·s at 25° C.

In one embodiment, wherein the cured product of the composition of the present invention has a comparatively low Young's modulus and excellent water resistance, the composition is useful as a primary material for optical fibers. The cured product preferably has a Young's modulus of between 10 MPa or less, more preferably 0.5-3 MPa.

In another embodiment of the invention, when the curable liquid resin composition of the present invention is used as a secondary material or ribbon matrix material for optical fibers, the Young's modulus of the cured product obtained by curing the composition is preferably 100-2,500 MPa.

The stress-relaxation time that is defined as the time required for the stress to decline to 37% of the initial stress when a tensile strain of 5% is applied to the cured product at a humidity of 50%, is usually 10 minutes or less, preferably 5 minutes or less, and particularly preferably 3 minutes or less.

The invention also relates to curable liquid resin compositions which are colored.

The invention also relates to the use of the compositions according to the invention as a primary coating, secondary coating, ink composition or matrix material on an optical glass fiber, and to a cured product obtained by curing the curable liquid resin composition according to the invention.

The invention also relates to a coated optical fiber comprising a glass optical fiber having a primary coating, a coated optical fiber comprising a glass optical fiber having a primary coating and a secondary coating, a coated optical fiber comprising a glass optical fiber having a primary coating, a secondary coating and an upjacketing coating, a coated optical fiber comprising a glass optical fiber and a single coating, a coated optical fiber comprising a glass optical fiber, a single coating and an upjacketing coating, and each coated fiber optionally having an ink composition applied thereon, and to an optical fiber ribbon comprising at least two of said coated and optionally inked optical fibers wherein at least one of said coating or composition is derived from a radiation-curable composition according to the invention.

EXAMPLES

The present invention is described below in more detail by examples. However, the present invention is not limited to these examples.

Preparation Example 1

A reaction vessel equipped with a stirrer was charged with 200.47 g of tolylene diisocyanate, 0.116 g of 2,6-di-t-butyl-p-cresol, and 96.752 g of 2-ethylhexyl acrylate. The mixture was cooled to 15° C. with stirring. After the addition of 0.387 g dibutyltin dilaurate, 149.64 g of 2-hydroxypropyl acrylate was added dropwise while controlling the temperature at less than 30° C. After the addition, the mixture was stirred at 40° C. for one hour. Next, 133.66 g of 2-hydroxyethyl acrylate was added dropwise while controlling the temperature at less than 60° C. After the addition, the mixture was stirred at 60° C. The reaction was terminated when the residual isocyanate was 0.1 wt % or less. The urethane (meth)acrylate oligomer thus obtained is designated as "Polymerizable oligomer 1". The mixture was then cooled to 50-60° C. After the addition of 387.01 g of 2-ethylhexyl acrylate, 2.90 g of Irganox 245 (manufactured by Ciba Specialty Chemicals Co., Ltd.) and 29.03 g of Irgacure 184 (manufactured by Ciba Specialty Chemicals Co., Ltd.), the mixture was stirred until it became a homogeneous liquid resin, thereby obtaining a composition.

Preparation Example 2

A reaction vessel equipped with a stirrer was charged with 180.88 g of polypropylene glycol with a number average molecular weight of 1,000, 9.02 g of polypropylene glycol with a number average molecular weight of 10,000, 0.182 g of 2,6-di-t-butyl-p-cresol, 257.22 g of tolylene diisocyanate, and 95.80 g of 2-ethylhexyl acrylate. The mixture was cooled to 15° C. with stirring. After the addition of 0.605 g of dibutyltin dilaurate, the mixture was stirred for about one hour while controlling the temperature at less than 40° C. After stirring the mixture while cooling to room temperature, 88.89 g of 2-hydroxypropyl acrylate was added dropwise while controlling the temperature at less than 30° C. After the addition, the mixture was stirred at 40° C. for one hour. Next, 220.77 g of 2-hydroxyethyl acrylate was added dropwise while controlling the temperature at less than 60° C. After the addition, the mixture was stirred at 60° C. The reaction was terminated when the residual isocyanate was 0.1 wt % or less.

The urethane (meth)acrylate oligomer thus obtained is designated as "Polymerizable oligomer 2". The mixture was then cooled to 50-60° C. After the addition of 114.95 g of 2-ethylhexyl acrylate, 2.90 g of Irganox 245 (manufactured by Ciba Specialty Chemicals Co., Ltd.) and 29.03 g of Irgacure 184 (manufactured by Ciba Specialty Chemicals Co., Ltd.), the mixture was stirred until it became a homogeneous liquid resin, thereby obtaining a composition.

Preparation Example 3

A reaction vessel equipped with a stirrer was charged with 180.89 g of polypropylene glycol with a number average molecular weight of 1,000, 9.02 g of polypropylene glycol with a number average molecular weight of 10,000, 0.172 g of 2,6-di-t-butyl-p-cresol, 241.35 g of tolylene diisocyanate, and 95.80 g of 2-ethylhexyl acrylate. The mixture was cooled to 15° C. with stirring. After the addition of 0.573 g of dibutyltin dilaurate, the mixture was stirred for about one hour while controlling the temperature at less than 40° C. After stirring the mixture while cooling to room temperature, 77.79 g of 2-hydroxypropyl acrylate was added dropwise while controlling the temperature at less than 30° C. After the addition, the mixture was stirred at 40° C. for one hour. Next, 212.00 g of 2-hydroxyethyl acrylate was added dropwise while controlling the temperature at less than 60° C. After the addition, the mixture was stirred at 60° C. The reaction was terminated when the residual isocyanate was 0.1 wt % or less. The urethane (meth)acrylate oligomer thus obtained is designated as "Polymerizable oligomer 3". The mixture was then cooled to 50-60° C. After the addition of 39.62 g of 2-ethylhexyl acrylate, 2.90 g of Irganox 245 (manufactured by Ciba Specialty Chemicals Co., Ltd.), 29.02 g of Irgacure 184 (manufactured by Ciba Specialty Chemicals Co., Ltd.), and 116.02 g of 2-hydroxypropyl acrylate, the mixture was stirred until it became a homogeneous liquid resin, thereby obtaining a composition.

Preparation Example 4

A reaction vessel equipped with a stirrer was charged with 180.89 g of polypropylene glycol with a number average molecular weight of 1,000, 9.02 g of polypropylene glycol with a number average molecular weight of 10,000, 0.172 g of 2,6-di-t-butyl-p-cresol, 241.35 g of tolylene diisocyanate, and 114.96 g of 2-ethylhexyl acrylate. The mixture was cooled to 15° C. with stirring. After the addition of 0.573 g of dibutyltin dilaurate, the mixture was stirred for about one hour while controlling the temperature at less than 40° C. After stirring the mixture while cooling to room temperature, 77.79 g of 2-hydroxypropyl acrylate was added dropwise while controlling the temperature at less than 30° C. After the addition, the mixture was stirred at 40° C. for one hour. Next, 212.00 g of 2-hydroxyethyl acrylate was added dropwise while controlling the temperature at less than 60° C. After the addition, the mixture was stirred at 60° C. The reaction was terminated when the residual isocyanate was 0.1 wt % or less. The urethane (meth)acrylate oligomer thus obtained is designated as "Polymerizable oligomer 4". The mixture was then cooled to 50-60° C. After the addition of 2.87 g of Irganox 245 (manufactured by Ciba Specialty Chemicals Co., Ltd.), 28.74 g of Irgacure 184 (manufactured by Ciba Specialty Chemicals Co., Ltd.), and 134.12 g of 2-hydroxypropyl acrylate, the mixture was stirred until it became a homogeneous liquid resin, thereby obtaining a curable liquid resin composition.

Comparative Preparation Example 1

A reaction vessel equipped with a stirrer was charged with 16.98 g of 2,4-tolylene diisocyanate, 0.015 g of 2,6-di-t-butyl-p-cresol, 0.05 g of dibutyltin dilaurate, and 0.005 g of phenothiazine. The mixture was cooled with ice to 10° C. or below with stirring. After the addition of 11.32 g of hydroxyethyl acrylate dropwise while controlling the temperature at 20° C. or less, the mixture was allowed to react for one hour with stirring. Next, 25.40 g of polytetramethylene glycol with a number average molecular weight of 1,000 and 9.36 g of alkylene oxide addition diol of bisphenol A with a number average molecular weight of 400 were added, and the mixture was stirred at 70-75° C. for three hours. The reaction was terminated when the residual isocyanate was 0.1 wt % or less to obtain a urethane (meth)acrylate oligomer (hereinafter referred to as "Polymerizable oligomer C1"). The polymerizable oligomer was then cooled to 50-60° C. After the addition of 9.70 g of isobornyl acrylate, 14.55 g of tricyclodecanediyldimethylene diacrylate, 9.70 g of N-vinylcaprolactam, 2.91 g of Irgacure 184 (manufactured by Ciba Specialty Chemicals Co., Ltd.), and 0.3 g of Sumilizer GA-80 (manufactured by Sumitomo Chemical Industries Co., Ltd.), the mixture was stirred to homogenize, thereby obtaining a curable liquid resin composition.

Test Example 1

(1) Preparation of Test Specimen

The curable liquid resin composition was applied to a glass plate using an applicator bar for a 250 μm thickness. The composition was cured by irradiation of ultraviolet rays at a dose of 1 J/cm$^2$ in air to obtain a test film.

(2) Measurement of Young's Modulus

The film was cut into a sample in the shape of a strip having a drawn part with a width of 6 mm and a length of 25 mm. The sample was subjected to a tensile test at a temperature of 23° C. and a humidity of 50%. The Young's modulus was calculated from the tensile strength at a strain of 2.5% and a tensile rate of 1 mm/min.

(3) Measurement of Stress-Relaxation Time

A sample in the shape of a strip with a width of 6 mm and a length of 25 mm was prepared from the above film. A strain of 5% was applied to the sample at a rate of 1,000 mm/minute at a temperature of 23° C. and a humidity of 50%. Changes in the stress was monitored by suspending the cross head of a tensile tester (Autograph AGS-50G manufactured by Shimazu Corp.). A period of time in which the stress was reduced to 37% of the initial stress was determined as the stress-relaxation time.

The components (wt %) and the evaluation results of Examples 1-4 and Comparative Example 1 are shown in Table 1.

TABLE 1

|  | Example 1 | Example 2 | Example 3 | Example 4 | Comparative Example 1 |
|---|---|---|---|---|---|
| Polymerizable oligomer 1 | 48.4 |  |  |  | 62.9 |
| Polymerizable oligomer 2 |  | 75.7 |  |  |  |

TABLE 1-continued

|  | Example 1 | Example 2 | Example 3 | Example 4 | Comparative Example 1 |
|---|---|---|---|---|---|
| Polymerizable oligomer 3 |  |  | 71.8 |  |  |
| Polymerizable oligomer 4 |  |  |  | 72.0 |  |
| Polymerizable oligomer C1 |  |  |  |  | 62.9 |
| 2-Ethylhexyl acrylate | 48.4 | 21.1 | 13.5 | 11.5 |  |
| Isobornyl acrylate |  |  |  |  | 9.7 |
| N-Vinylcaprolactam |  |  |  |  | 9.7 |
| 2-Hydoxyethyl acrylate |  |  |  |  |  |
| 2-Hydoxypropyl acrylate |  |  | 11.6 | 13.4 |  |
| Tricyclodecane-diyldimethylene acrylate |  |  |  |  | 14.5 |
| Irgacure 184 | 2.91 | 2.91 | 2.81 | 2.81 | 2.90 |
| Irganox 245 | 0.29 | 0.29 | 0.29 | 0.29 |  |
| GA-80 |  |  |  |  | 0.30 |
| Young's modulus | 530 | 830 | 807 | 860 | 890 |
| Stress-relaxation time | 0.91 | 1.80 | 2.70 | 5.46 | 19.63 |

Irgacure 184: 1-Hydroxycyclohexyl phenyl ketone (manufactured by Ciba Specialty Chemicals Co., Ltd.).
Irganox 245: Ethylenebis(oxyethylene)bis[3-(5-tert-butyl-4-hydroxy-m-tolyl)propionate] (manufactured by Ciba Specialty Chemicals Co., Ltd.),
GA-80: 3,9-Bis[2-[3-(3-t-butyl-4-hydroxy-5-methylphenyl)propionyloxy]-1,1-dimethylethyl]-2,4,8,10-tetraoxaspiro-[5,5]undecene (manufactured by Sumitomo Chemical Industries Co., Ltd.)

Preparation Example 5

Synthesis Example of Urethane (Meth)Acrylate Oliqomer

A reaction vessel equipped with a stirrer was charged with 91.285 parts of polypropylene glycol with a number average molecular weight of 4,000 ("Acclaim 4200" manufactured by Sumitomo Bayer Urethane Co., Ltd.), 5.956 parts of 2,4-toluene diisocyanate, 0.024 parts of 2,6-di-t-butyl-p-cresol, and 0.008 part of phenothiazine. The mixture was cooled to 15° C. with stirring. The molar ratio of polypropylene glycol to 2,4-toluene diisocyanate was 1:1.50. After the addition of 0.08 part of dibutyltin dilaurate, the mixture was slowly heated to 35° C. in one hour with stirring. The mixture was then heated to 50° C. and allowed to react. After the residual isocyanate group concentration decreased to 0.98 wt % or less of the total amount of the reactants, 2.647 parts of 2-hydroxyethyl acrylate was added. The mixture was allowed to react at about 60° C. with stirring. The reaction was terminated when the residual isocyanate group concentration was 0.1 wt % or less. The urethane (meth)acrylate obtained is indicated as "polymerizable oligomer 5".

Preparation Example 6

Synthesis Example of Urethane (Meth)Acrylate Oliqomer

A reaction vessel equipped with a stirrer was charged with 87.794 parts of polypropylene glycol with a number average molecular weight of 2,000 ("Acclaim 2200" manufactured by Sumitomo Bayer Urethane Co., Ltd.), 9.584 parts of 2,4-toluene diisocyanate, 0.024 part of 2,6-di-t-butyl-p-cresol, and 0.008 part of phenothiazine. The mixture was cooled to 15° C. with stirring. The molar ratio of polypropylene glycol to 2,4-toluene diisocyanate was 1:1.25. After the addition of 0.08 part of dibutyltin dilaurate, the mixture was slowly heated to 35° C. in one hour with stirring. The mixture was then heated to 50° C. and allowed to react. After the residual isocyanate group concentration decreased to 0.94 wt % or less of the total amount of the reactants, 2.546 parts of 2-hydroxyethyl acrylate was added. The mixture was allowed to react at about 60° C. with stirring. The reaction was terminated when the residual isocyanate group concentration was 0.1 wt % or less. The urethane (meth)acrylate obtained is indicated as "polymerizable oligomer 6".

Preparation Example 7

Synthesis Example of Urethane (Meth)Acrylate Oligomer

A reaction vessel equipped with a stirrer was charged with 93.136 parts of polypropylene glycol with a number average molecular weight of 8,000 ("Acclaim 8200" manufactured by Sumitomo Bayer Urethane Co., Ltd.), 4.051 parts of 2,4-toluene diisocyanate, 0.024 parts of 2,6-di-t-butyl-p-cresol, and 0.008 parts of phenothiazine. The mixture was cooled to 15° C. with stirring. The molar ratio of polypropylene glycol to 2,4-toluene diisocyanate was 1:2.0. After the addition of 0.08 parts of dibutyltin dilaurate, the mixture was slowly heated to 35° C. in one hour with stirring. The mixture was then heated to 50° C. and allowed to react. After the residual isocyanate group concentration decreased to 1.00 wt % or less of the total amount of the reactants, 2.701 parts of 2-hydroxyethyl acrylate was added. The mixture was allowed to react at about 60° C. with stirring. The reaction was terminated when the residual isocyanate group concentration was 0.1 wt % or less. The urethane (meth)acrylate obtained is indicated as "polymerizable oligomer 7".

Preparation Example 8

Synthesis Example of Urethane (Meth)Acrylate Oligomer

A reaction vessel equipped with a stirrer was charged with 77.433 parts of polypropylene glycol with a number average molecular weight of 2,000 ("Acclaim 2200" manufactured by Sumitomo Bayer Urethane Co., Ltd.), 13.473 parts of 2,4-toluene diisocyanate, 0.024 part of 2,6-di-t-butyl-p-cresol, and 0.008 part of phenothiazine. The mixture was cooled to 15° C. with stirring. The molar ratio of polypropylene glycol to 2,4-toluene diisocyanate was 1:2.0. After the addition of 0.08 part of dibutyltin dilaurate, the mixture was slowly heated to 35° C. in one hour with stirring. The mixture was then heated to 50° C. and allowed to react. After the residual isocyanate group concentration decreased to 3.5 wt % or less of the total amount of the reactants, 8.982 parts of 2-hydroxyethyl acrylate was added. The mixture was allowed to react at about 60° C. with stirring. The reaction was terminated when the residual isocyanate group concentration was 0.1 wt % or less. The urethane (meth)acrylate obtained is indicated as "polymerizable oligomer 8".

Examples 5-13

Curable liquid resin compositions shown in Table 2 were prepared, and the viscosity, Young's modulus, change in viscosity, and change in Young's modulus were measured according to the following method.

Test Example 2

(1) Measurement Method for Viscosity

The viscosity of each of the compositions obtained in the Examples and Comparative Examples at 25° C. was measured using a B8H-BII viscometer (manufactured by Tokimec Inc.). The composition was then subjected to a durability test, wherein the composition was placed in an oven at 60° C. for 60 days, and the viscosity of the composition was measured again (hereinafter referred to as "viscosity after endurance"). The heat stability of the curable liquid resin composition was evaluated by calculating the change between the initial viscosity and the viscosity after heating using the following formula (4).

Viscosity change rate (%)=100−(initial viscosity/viscosity after endurance)×100     (4)

(2) Measurement Method for Young's Modulus and Water Resistance

The Young's modulus of each of the compositions obtained in Examples and Comparative Examples was measured after curing. The curable liquid resin composition was applied to a glass plate using an applicator bar for a 354 μm thickness. The composition was cured by irradiation of ultraviolet rays at a dose of 1 J/cm² in air to obtain a test film. A sample in the shape of a strip with a width of 6 mm and a length of 25 mm was prepared from the cured film. A tensile test was conducted in accordance with JIS K7127 using an AGS-1KND tensile tester (manufactured by Shimadzu Corporation) at a temperature of 23° C. and a humidity of 50%. The Young's modulus was calculated from the tensile strength at a tensile rate of 1 mm/min and a strain of 2.5%. Next, the cured film was subjected to a water resistance test, wherein the composition was placed in hot water at 80° C. for 60 days, and the Young's modulus of the composition was measured again (hereinafter referred to as "Young's modulus after water resistance test"). Water resistant stability of the cured product was evaluated by calculating the change between the initial Young's modulus and the Young's modulus after water resistance test using the following formula (5).

Young's modulus change rate (%)=100−(initial Young's modulus/Young's modulus after water resistance test)×100     (5)

(3) Measurement Method for Adhesion to Glass

The adhesion to glass of each of the compositions obtained in Examples and Comparative Examples was measured. The curable liquid resin composition was applied to a glass plate using an applicator bar for a 354 μm thickness. The composition was cured by irradiation of ultraviolet rays at a dose of 1 J/cm² in air to obtain a test film. A sample in the shape of a strip with a width of 10 mm and a length of 50 mm was prepared from the cured film. A glass adhesion test was conducted using an AGS-1KND tensile tester (manufactured by Shimadzu Corporation) at a temperature of 23° C. and a humidity of 50%. The adhesion to glass was determined from the tensile strength after 30 seconds at a tensile rate of 50 mm/min.

(4) Measurement of Cure Speed

The cure speed of each of the compositions obtained in Examples and Comparative Examples was measured. The curable liquid resin composition was applied to a glass plate using an applicator bar for a 354 μm thickness. The composition was cured by irradiation of ultraviolet rays at doses of 20 mJ/cm² and 500 mJ/cm² in air to obtain two types of test films. Samples in the shape of a strip, each having a drawn part with a width of 6 mm and a length of 25 mm, were prepared from the two types of cured films. A tensile test was conducted in accordance with JIS K7127 using an AGS-1KND tensile tester (manufactured by Shimadzu Corporation) at a temperature of 23° C. and a humidity of 50%. The Young's modulus was calculated from the tensile strength at a tensile rate of 1 mm/min and a strain of 2.5%. The cure speed of the composition was evaluated by calculating the ratio of the Young's modulus of the test film cured at a dose of 20 mJ/cm² and the Young's modulus of the test film cured at a dose of 500 mJ/cm² using the following formula (6).

Cure speed (%)=[Young's modulus of cured film cured at 20 mJ/cm²]/[Young's modulus of cured film cured at 500 mJ/cm²]     (6)

TABLE 2

| | Diol/diisocyante molar ratio | Example 5 | 6 | 7 | 8 | 9 | 10 | 11 | 12 | 13 |
|---|---|---|---|---|---|---|---|---|---|---|
| Polymerizable oligomer 5 | 1.5 | 61.8 | 61.8 | — | 61.8 | 61.8 | 61.8 | — | — | 61.8 |
| Polymerizable oligomer 6 | 1.25 | — | — | 61.8 | — | — | — | — | — | — |
| Polymerizable oligomer 7 | 2.0 | — | — | — | — | — | — | 61.8 | — | — |
| Polymerizable oligomer 8 | 2.0 | — | — | — | — | — | — | — | 61.8 | — |
| 2-Ethylhexyl acrylate | — | 14.0 | 20.0 | 14.0 | — | 14.0 | — | 14.0 | 14.0 | 14.0 |
| Lauryl acrylate | — | — | — | — | 14.0 | — | — | — | — | — |
| Nonylphenol EO acrylate (M113) | — | 14.0 | 8.0 | 14.0 | 14.0 | 14.0 | 14.0 | 14.0 | 14.0 | 14.0 |
| N-vinylcaprolactam | — | 7.8 | 7.8 | 7.8 | 7.8 | — | 7.8 | 7.8 | 7.8 | 7.8 |
| Ethoxyethoxyethyl acrylate | — | — | — | — | — | 7.8 | 14 | — | — | — |
| Lucirin TPO | — | 1.3 | 1.3 | 1.3 | 1.3 | 1.3 | 1.3 | 1.3 | 1.3 | 1.3 |
| Diethylamine | — | 0.1 | 0.1 | 0.1 | 0.1 | 0.1 | 0.1 | 0.1 | 0.1 | 0.1 |
| γ-Mercaptopropyltrimethoxysilane (SH6062) | — | 1.0 | 1.0 | 1.0 | 1.0 | 1.0 | 1.0 | 1.0 | 1.0 | — |
| Viscosity of resin composition (Pa·s) | — | 3.5 | 2.0 | 3.9 | 3.6 | 3.4 | 3.7 | 4.8 | 4.3 | 3.5 |
| Young's modulus of cured product | — | 1.2 | 1.0 | 1.3 | 1.1 | 1.0 | 1.2 | 1.5 | 12.0 | 1.2 |

TABLE 2-continued

| | Diol/diisocyante molar ratio | Example | | | | | | | | |
|---|---|---|---|---|---|---|---|---|---|---|
| | | 5 | 6 | 7 | 8 | 9 | 10 | 11 | 12 | 13 |
| (MPa) | | | | | | | | | | |
| Viscosity change rate of liquid resin after durability test | — | +4% | +4% | +5% | +5% | +3% | +5% | +35% | +6% | +5% |
| Young's modulus change rate of cured product after water resistance test | — | +1% | +3% | +2% | +2% | +1% | +133% | +53% | +5% | +2% |
| Adhesion to quartz glass (N/m) | — | 25 | 22 | 28 | 23 | 20 | 20 | 26 | 20 | 5 |
| Cure speed | — | 0.87 | 0.85 | 0.85 | 070 | 0.60 | 0.87 | 0.85 | 0.87 | 0.87 |

As clear from Table 2, the composition of the present invention has a liquid resin viscosity suitable as an optical fiber coating material, can produce a cured product with a Young' modulus suitable as a primary material, has excellent storage stability of the liquid resin, and can produce a cured product having excellent water resistance. This is in particular true for Examples 5-9, wherein the polymerizable oligomer is made with a diol/diisocyanate ratio of between 1.1 and 1.8, in which component (B) according to the formula (2), $CH_2=C(R^1)COO-C_nH_{2n+1}$, is present and which contain component (D) a silane coupling agent. Therefore, Examples 5-9 represent compositions which are particularly suitable for primary coatings.

The invention claimed is:

1. A curable liquid resin composition comprising the following components (A), (B), (C), (D), and (E):
   (A) a urethane (meth)acrylate obtained from a diol compound, an aromatic diisocyanate compound in an amount of 1.1-1.8 molar equivalents for one mol of the diol compound, and a hydroxyl group-containing (meth)acrylate compound;
   (B) 2-ethylhexyl acrylate;
   (C) a polymerization initiator;
   (D) a silane coupling agent; and
   (E) a polymerizable unsaturated monomer which is a lactam containing a vinyl group;
   wherein the diol compound in component (A) is a polyether diol having an average molecular weight of 1,000-5,000, which is a ring-opening polymer of one or more ion-polymerizable cyclic compounds having 2-4 carbon atoms;
   wherein the stress-relaxation time, which is defined as the time required for the stress to decline to 37% of the initial stress when a tensile strain of 5% is applied to the cured resin composition at a humidity of 50%, is 10 minutes or less; and
   wherein said hydroxyl group-containing (meth)acrylate compound is in an amount which is 0.1 to 0.7 equivalent for one equivalent of the hydroxyl group of the diol compound.

2. The curable liquid resin composition according to claim 1, wherein the Young's modulus of the cured product, obtained by curing the composition is 10 MPa or less and the urethane (meth)acrylate (A) has a polystyrene-reduced molecular weight measured by gel permeation chromatography of 1,500-20,000.

3. The curable liquid resin composition according to claim 1, wherein the Young's modulus of the cured product, obtained by curing the composition is 100-2,500 MPa and the urethane (meth)acrylate (A) has a polystyrene-reduced molecular weight measured by the gel permeation chromatography of 500-20,000.

4. The curable liquid resin composition according to claim 1, wherein the composition is colored.

5. A cured product obtained by curing the curable liquid resin composition according to claim 1.

6. A coated optical fiber comprising a glass optical fiber having a primary coating, a coated optical fiber comprising a glass optical fiber having a primary coating and a secondary coating, a coated optical fiber comprising a glass optical fiber having a primary coating, a secondary coating and an upjacketing coating, a coated optical fiber comprising a glass optical fiber and a single coating, a coated optical fiber comprising a glass optical fiber, a single coating and an upjacketing coating, and each coated fiber optionally having an ink composition applied thereon, and to an optical fiber ribbon comprising at least two of said coated and optionally inked optical fibers wherein at least one of said coating or composition is derived from the curable liquid resin composition according to claim 1.

7. The cured product of claim 5 which is a product selected from the group consisting of a primary coating, a secondary coating, an ink composition, and a matrix material on an optical glass fiber.

8. An optical fiber, comprising a cured product of claim 5 as a primary coating.

9. An optical fiber, comprising a cured product of claim 5 as a secondary coating.

* * * * *